(No Model.)

W. E. CASE.
APPARATUS FOR CONVERTING HEAT ENERGY INTO ELECTRICAL ENERGY.

No. 374,173. Patented Dec. 6, 1887.

WITNESSES:
Gustave Dieterich
Edgar Goodrich

INVENTOR
Willard E. Case
BY Park Benjamin
his ATTORNEY

UNITED STATES PATENT OFFICE.

WILLARD E. CASE, OF AUBURN, NEW YORK.

APPARATUS FOR CONVERTING HEAT ENERGY INTO ELECTRICAL ENERGY.

SPECIFICATION forming part of Letters Patent No. 374,173, dated December 6, 1887.

Application filed July 28, 1886. Serial No. 209,342. (No model.)

*To all whom it may concern:*

Be it known that I, WILLARD E. CASE, of Auburn, Cayuga county, New York, have invented a new and useful Improvement in Apparatus for Converting Heat Energy into Electrical Energy, of which the following is a specification.

My invention relates to the art and apparatus for converting heat energy into electrical energy, for which Letters Patent were granted to me on the 29th day of June, 1886, Nos. 344,345, 344,346, and 344,347.

My invention consists, first, in the use of mercury in combination with the precipitated or pulverized metal as an element in the cell; and, second, in the construction and arrangement of said cell, as hereinafter more particularly set forth.

Figure 1:
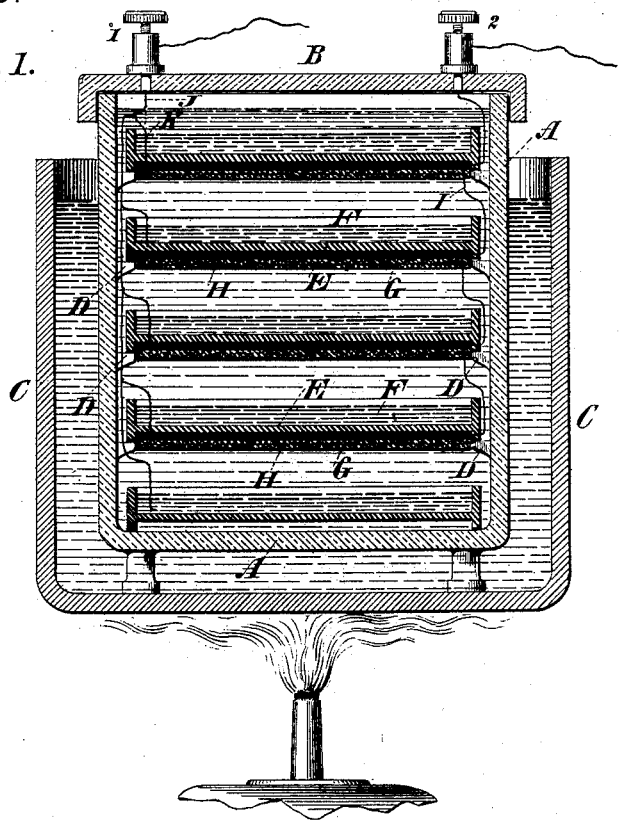
Figure 2:
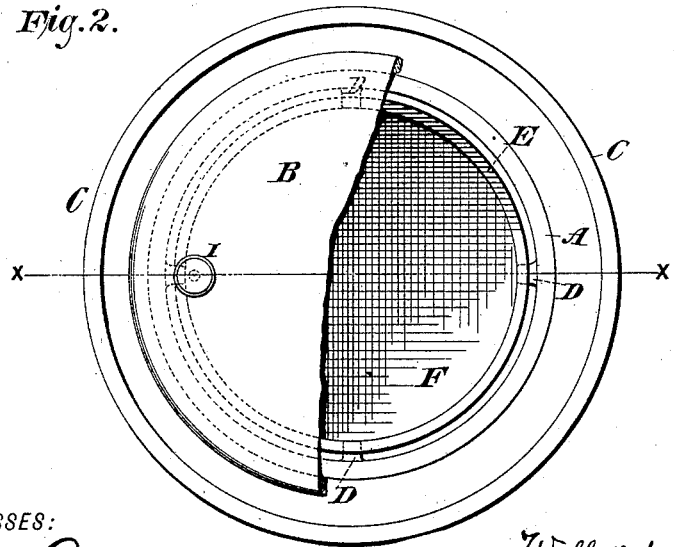

In the accompanying drawings, Figure 1 is a vertical section on the line $xx$ of Fig. 2. Fig. 2 is a plan view with a portion of the cover broken away to show the interior.

Similar letters of reference indicate like parts.

In the apparatus for converting heat energy into electrical energy described in my aforesaid Letters Patent I employ an electrode of tin, a liquid consisting of a chromic-chloride solution, and an electrode preferably of carbon. This cell yields substantially no current when at normal temperature; but when heat is applied a current is set up, the strength of which augments until a certain maximum temperature below that of boiling-water is reached. Chlorine liberated from the liquid then most energetically attacks the tin and leaves the chromium, so forming stannous chloride. On the cooling of the cell, however, to a certain lower temperature the chlorine releases the tin, again combines with the chromium, and the tin is precipitated in a fine powder. The tin element may be originally introduced as a solid mass of metal or as a powder; but, as appears from the foregoing, it ultimately reaches a pulverized state.

I have found by experiment that inasmuch as the tin element as a concrete body, so to speak, forms itself, it is very advantageous to provide a means whereby all its particles normally not cohesive will be electrically connected or welded together by a conducting material which will not be attacked by the liquid in the cell. The mass of pulverized metal is thus rendered more homogeneous as a whole, and more uniformly acted upon by the liquid. Such a material is mercury, which I place so that it will receive and collect the precipitated tin particles and amalgamate them together. This it does as fast as it receives the particles, by reason of its own mobility. So also it amalgamates the tin in the common sense of the term, as employed in connection with galvanic batteries—that is, it prevents local action, &c., between the tin particles. The mercury which is not attacked by the chromic-chloride liquid may be disposed in a trough or tray or placed in the bottom of the containing-vessel of the cell, or otherwise arranged in any suitable manner to enable it to collect the precipitated metal.

A is the containing-vessel. B is the cover.

C is an outer vessel for holding water, which is heated in any convenient way, as by the lamp shown.

Within the vessel A may be formed ears or projections D, upon which rest the trays E. Said trays may be made of any suitable nonconducting material, such as glass or rubber. Each tray contains mercury F, and to the lower portion of each tray may be secured a plate of carbon, G, which plate may be covered by a partition of porous insulating material, as H, in order to prevent possible contact of the precipitated metal and the carbon.

It is not essential that the carbon plate H should be fastened to the lower side of the tray; nor is it material that said carbon plate, when placed above the mercury in the tray next below, should be protected by the porous partition. I prefer, however, the arrangement above described. The carbon is omitted in the lowest tray E, which rests upon the bottom of the vessel A.

The vessel A contains chromic-chloride liquid, which circulates freely around the trays. The several carbons are electrically connected in any suitable way, as by the wire I, (which should be covered with insulating material to prevent contact with the liquid,) to the binding-post 2. The mercury in the several trays is also connected in any suitable way, as by the wire J and branches K, (also insulated,) to the binding-post 1. Each carbon plate above the several trays forms a couple with the tin amalgam in the tray below. There may be any desired number of trays E in the vessel A, and into the mercury in said trays the tin is precipitated in the manner already described.

I claim—

1. In an apparatus for converting heat energy into electrical energy, substantially as set forth, a liquid containing chromic chloride, a carbon element, and an element of tin combined with mercury.

2. In an apparatus for converting heat energy into electrical energy, substantially as set forth, a liquid containing chromic chloride and an element of tin combined with mercury in the form of a liquid or viscous amalgam.

3. In an apparatus for converting heat energy into electrical energy, substantially as set forth, the combination of the vessel A, containing chromic chloride liquid and supported therein, the tray E, containing mercury and tin amalgam, carbon plate G, and circuit-connections.

4. In an apparatus for converting heat energy into electrical energy, substantially as set forth, the combination of the vessel A, containing chromic-chloride liquid, the series of trays arranged one above the other and containing tin and mercury amalgam, carbon plates G, and circuit-connections.

5. The combination of the tray E, of non-conducting material, a carbon plate, G, secured to and beneath said tray, and a porous partition, H, of insulating material, secured beneath said carbon plate, substantially as described.

WILLARD E. CASE.

Witnesses:
G. B. LONGSTREET,
J. ALEXANDER, Jr.